(12) United States Patent
Woodard et al.

(10) Patent No.: US 7,711,509 B2
(45) Date of Patent: May 4, 2010

(54) METHOD OF CALIBRATING A FLUID-LEVEL MEASUREMENT SYSTEM

(75) Inventors: Stanley E. Woodard, Hampton, VA (US); Bryant D. Taylor, Smithfield, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 139 days.

(21) Appl. No.: 11/930,222

(22) Filed: Oct. 31, 2007

(65) Prior Publication Data

US 2008/0243418 A1 Oct. 2, 2008

Related U.S. Application Data

(60) Provisional application No. 60/908,698, filed on Mar. 29, 2007.

(51) Int. Cl.
*G01F 25/00* (2006.01)
*G01F 1/00* (2006.01)
(52) U.S. Cl. ........................ 702/100; 73/1.73
(58) Field of Classification Search ................. 702/100; 73/1.73
See application file for complete search history.

(56) References Cited

U.S. PATENT DOCUMENTS

| | | | |
|---|---|---|---|
| 4,713,618 A * | 12/1987 | Carlson et al. | 324/438 |
| 4,806,847 A * | 2/1989 | Atherton et al. | 73/304 C |
| 4,929,896 A | 5/1990 | Lara | |
| 5,103,368 A * | 4/1992 | Hart | 361/284 |
| 5,182,545 A | 1/1993 | Goekler et al. | |
| 5,463,378 A | 10/1995 | Gibb | |
| 5,589,823 A | 12/1996 | Lange | |
| 5,623,252 A | 4/1997 | Cacciola et al. | |
| 5,625,343 A | 4/1997 | Rottmar | |
| 5,627,522 A | 5/1997 | Walker et al. | |
| 5,642,097 A | 6/1997 | Martel | |
| 5,708,424 A | 1/1998 | Orlando et al. | |
| 5,802,910 A | 9/1998 | Krahn | |
| 5,861,811 A | 1/1999 | Lease et al. | |
| 5,900,810 A | 5/1999 | Park et al. | |
| 5,907,278 A | 5/1999 | Park et al. | |
| 6,016,697 A | 1/2000 | McCulloch et al. | |
| 6,028,521 A | 2/2000 | Issachar | |
| 6,177,874 B1 | 1/2001 | Chena et al. | |
| 6,292,104 B1 | 9/2001 | Wakabayashi | |
| 6,335,690 B1 | 1/2002 | Konchin et al. | |

(Continued)

OTHER PUBLICATIONS

U.S. Appl. No. 11/856,807, filed Sep. 18, 2007, Woodard et al.

(Continued)

*Primary Examiner*—Bryan Bui
(74) *Attorney, Agent, or Firm*—Robin W. Edwards

(57) ABSTRACT

A method of calibrating a fluid-level measurement system is provided. A first response of the system is recorded when the system's sensor(s) is (are) not in contact with a fluid of interest. A second response of the system is recorded when the system's sensor(s) is (are) fully immersed in the fluid of interest. Using the first and second responses, a plurality of expected responses of the system's sensor(s) is (are) generated for a corresponding plurality of levels of immersion of the sensor(s) in the fluid of interest.

23 Claims, 1 Drawing Sheet

U.S. PATENT DOCUMENTS

| | | |
|---|---|---|
| 6,345,214 B1 | 2/2002 | Dulphy-Vigor et al. |
| 6,404,331 B1 | 6/2002 | Huttinger et al. |
| 6,427,533 B1 | 8/2002 | Yoshida |
| 6,429,447 B1 | 8/2002 | Nowak et al. |
| 6,429,778 B1 | 8/2002 | Chuang |
| 6,474,156 B1 | 11/2002 | Endo et al. |
| 6,485,171 B1 | 11/2002 | Wang et al. |
| 6,498,566 B1 | 12/2002 | Lin |
| 6,546,795 B1 | 4/2003 | Dietz |
| 6,568,264 B2 | 5/2003 | Heger |
| 6,615,656 B1 | 9/2003 | Breed et al. |
| 6,617,968 B1 | 9/2003 | Odisho et al. |
| 6,624,755 B1 | 9/2003 | Chamberlin |
| 6,683,535 B1 | 1/2004 | Utke |
| 6,726,091 B1 | 4/2004 | Ehrick et al. |
| 6,727,822 B2 | 4/2004 | Chamberlin et al. |
| 6,822,565 B2 | 11/2004 | Thomas et al. |
| 6,964,278 B2 | 11/2005 | Tschanz |
| 7,086,593 B2 | 8/2006 | Woodard et al. |
| 7,091,868 B2 | 8/2006 | Ku et al. |
| 7,159,774 B2 | 1/2007 | Woodard et al. |
| 7,194,912 B2 | 3/2007 | Oglesby et al. |
| 7,255,004 B2 | 8/2007 | Taylor et al. |
| 2004/0036618 A1 | 2/2004 | Ku et al. |
| 2005/0018176 A1 | 1/2005 | Smith et al. |
| 2006/0283262 A1 | 12/2006 | Smith et al. |
| 2006/0290524 A1 | 12/2006 | Pfeiffer |
| 2007/0157718 A1 | 7/2007 | Woodard et al. |
| 2007/0183110 A1 | 8/2007 | Woodard et al. |

OTHER PUBLICATIONS

U.S. Appl. No. 11/864,012, filed Sep. 28, 2007, Woodard et al.

U.S. Appl. No. 11/671,089, filed Aug. 9, 2007, Woodard et al.

Stanley E. Woodard and Bryant D. Taylor, A Wireless Fluid-Level Measurement Technique, NASA/TM-2006-214320 p. 268-278, NASA (Jun. 2006).

Stanley E. Woodard and Bryant D. Taylor, A wireless fluid-level measurement technique, ScienceDirect Journal p. 267-278, Elsevier B.V. Publisher (Mar. 2007).

* cited by examiner

METHOD OF CALIBRATING A FLUID-LEVEL MEASUREMENT SYSTEM

ORIGIN OF THE INVENTION

This invention was made in part by an employee of the United States Government and may be manufactured and used by or for the Government of the United States of America for governmental purposes without the payment of any royalties thereon or therefor. Pursuant to 35 U.S.C. §119, the benefit of priority from provisional application 60/908,698, with a filing date of Mar. 29, 2007, is claimed for this non-provisional application.

BACKGROUND OF THE INVENTION

1. Field of the Invention

This invention relates to calibration of fluid-level measurement systems. More specifically, the invention is an in-situ method for calibrating a fluid-level measurement system that measures the capacitance or frequency of a response that is correlated to level of a fluid of interest where the calibration is accomplished non-manually without knowledge of the dielectric value of the fluid of interest, the physical properties of the fluid or the physical properties of the sensor.

2. Description of the Related Art

Some vehicle engines (e.g., used in trucks, automobiles, tractors, earth-moving equipment, etc.) are being developed and produced to operate using many different types of fuels to accommodate their use in different geographic locations where fuel type availability can vary. The vehicles in which these engines are incorporated include a fuel tank and, typically, a fuel-level measurement system. However, if the fuel-level measurement system is sensitive to the type of fuel being used, the measurement system must be calibrated to accommodate a particular type of fuel. Currently, this type of calibration must be performed by skilled personnel at a maintenance facility.

SUMMARY OF THE INVENTION

Accordingly, it is an object of the present invention to provide a method of calibrating a fluid-level measurement system for different types of fluids.

Another object of the present invention is to provide an in-situ non-manual method of calibrating a fluid-level measurement system for any fluid of interest where the system's sensor produces a capacitance response or a frequency response indicative of a fluid level without knowledge of the dielectric value of the fluid of interest, the physical properties of the fluid or the physical properties of the sensor.

Other objects and advantages of the present invention will become more obvious hereinafter in the specification and drawings.

In accordance with the present invention, a method of calibrating a fluid-level measurement system is provided. The measurement system includes fluid level sensing means that generates a response based on the portion of the fluid level sensing means that is immersed in a fluid. A first response of the fluid level sensing means is recorded when the fluid level sensing means is exposed to fluid at a first reference level. For example, the first reference level could be when the fluid is not in contact with a fluid of interest. A second response of the fluid level sensing means is recorded when the fluid level sensing means is exposed to fluid at a second reference level. For example, the second reference level could be when the fluid is fully immersed in the fluid of interest. Using the first response and the second response, a plurality of expected responses of the fluid level sensing means are generated for a corresponding plurality of levels of immersion of the fluid level sensing means in the fluid of interest. The responses can be indicative of capacitance or frequency.

DETAILED DESCRIPTION OF THE INVENTION

Prior to describing the calibration method of the present invention, some background will be presented for a recently-developed fluid-level measurement system that can be calibrated in accordance with the present invention. The fluid-level measurement system is a wireless system in that the systems' sensor(s) are powered and interrogated in a wireless fashion. As a result of such powering/interrogation, the systems' sensor(s) generate a frequency response. The sensors can be any of the following:

(i) a fluid-level capacitance sensor with an inductor coupled thereto as disclosed in U.S. Pat. Nos. 7,086,593, 7,159,774 and 7,255,004, the contents of each being hereby incorporated by reference in their entirety, or (ii) a fluid-level sensor that is defined by a conductor formed into a geometric pattern such as a spiral trace as disclosed in U.S. patent application Ser. No. 11/671,089, filed Feb. 5, 2007, the contents of which are hereby incorporated by reference in their entirety.

The powering and interrogation of the sensors can be accomplished in an inductive fashion using the magnetic field response measurement acquisition system described in the above-cited U.S. patents. The fluid level sensors can be in direct contact with the fluid of interest or can be completely encased/encapsulated without departing from the scope of the present invention.

By way of example, the calibrating method of the present invention will be described for use with the wireless magnetic field response fluid-level measuring system disclosed in the above-cited U.S. Pat. No. 7,255,004. This fluid-level measuring system has a fluid-level capacitance sensor with an inductor electrically coupled to the capacitance sensor. The capacitor can be defined either by electroplates or interdigitated electrodes. The inductor stores and releases magnetic energy at a harmonic rate equal to the resonant frequency of the circuit formed by the inductor electrically connected to the capacitor. When the capacitor is immersed in a fluid, its capacitance will change proportionally to the area of the capacitor plates (or number of interdigitated electrode pairs) exposed to the fluid. The capacitor-inductor sensor circuit is powered and interrogated using the methods described in the above-cited U.S. patents. If the width of the electroplates (or interdigitated electrodes) and separation distance between the electroplates (or electrodes) are constant, then the sensor circuit's response frequency is dependent upon the level of fluid in which the capacitor is immersed. For simplicity of discussion, a fluid-level sensor consisting of two parallel electroplates electrically connected to a lamina spiral inductor will be used to describe the method of measuring a fluid level.

Figure 1:
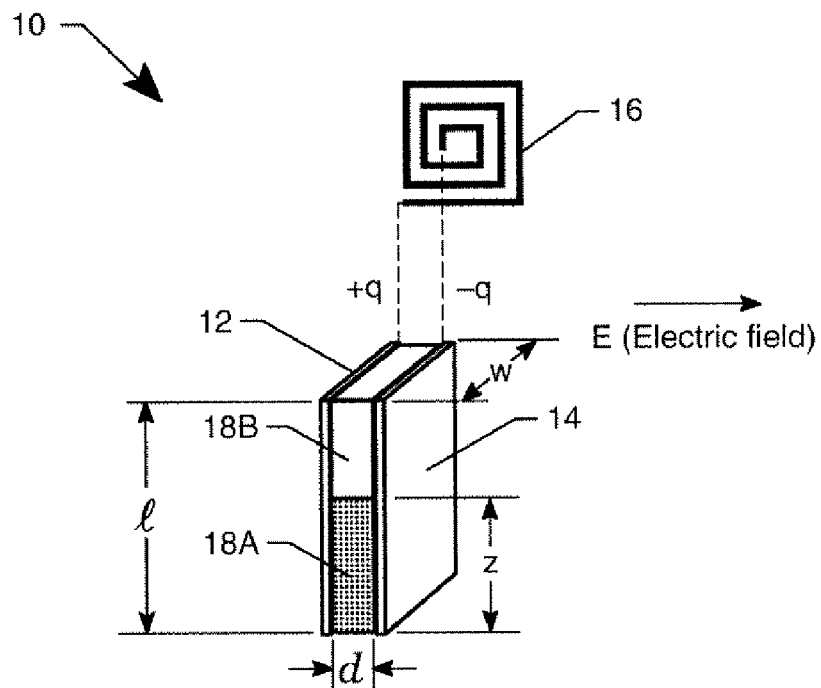
FIG. 1 is a schematic view of a capacitor-inductor sensor circuit configured for fluid-level sensing.

Referring now to the drawings and more particularly to FIG. 1, a schematic view of the key elements of a capacitor-inductor sensor circuit 10 is shown. Sensor circuit 10 has two electroplates 12 and 14 (defining a capacitor) and a lamina spiral inductor 16 electrically coupled to electroplates 12 and 14 as shown. Although a lamina spiral is shown, other inductor designs can be used. The charge on the electroplates and the direction of the electric field are also illustrated.

FIG. 1 depicts sensor circuit 10 completely immersed in two non-mixing stratified dielectric substances. A first substance 18A (e.g., a fluid) of dielectric constant $\kappa_2$ fills the lower portion of the gap between electroplates 12 and 14 to level z. The remaining upper portion of the gap is filled with a second substance 18B of dielectric constant $\kappa_1$. If air is substance 18B in the upper portion of the capacitor (i.e., $\kappa_1 \approx 1$), the density of the lower substance 18A will generally be far greater than air so that in most fluid-level measurement situations, $\kappa_2 \gg \kappa_1$. The capacitance C(z) is dependent upon the dielectric interface level z and is the summed capacitance due to contributions from both dielectric substances 18A and 18B. When the upper dielectric substance 18 is air, sensor circuit 10 can function as a fluid-level sensor. The two portions of the capacitor act as parallel capacitors since they share the same electric field. Therefore, the sensor capacitance C(z) is $$C(z) = C_{\kappa 1} + C_{\kappa 2} \qquad (1)$$
$$= (l-z)\frac{\varepsilon_0 w \kappa_1}{d} + \frac{\varepsilon_0 w \kappa_2}{d} z$$
$$= \frac{\varepsilon_0 w}{d}[l\kappa_1 + (\kappa_2 - \kappa_1)z]$$

where $C_{\kappa 1}$ and $C_{\kappa 2}$ are the capacitance contributions due to $\kappa_1$ and $\kappa_2$, respectively. The key geometric parameters of this embodiment are the total length of electroplates l, the width of the electroplates w, the separation of the electroplates d, and the dielectric constants $\kappa_2$ and $\kappa_1$. The permittivity constant ($\varepsilon_0$) is (8.85×10$^{-12}$ F/M).

When the space between the capacitor plates is completely filled with a fluid substance having a dielectric constant $\kappa_1$ (i.e. z=0), the capacitance is $$C(z) = \frac{\varepsilon_0 w l \kappa_1}{d}.$$

When the capacitor gap is completely filled with a fluid substance having a dielectric constant $\kappa_2$ (i.e., z=l), the capacitance is $$C(z) = \frac{\varepsilon_0 w l \kappa_2}{d}.$$

The resonant electrical frequency of sensor circuit 10 is $$\omega = \frac{1}{2\pi\sqrt{LC(z)}}. \qquad (2)$$

Inclusion of the equation for capacitance, Eq. (1), into that for resonant frequency, Eq. (2), results in the following expression (Eq. (3)) which relates the resonant frequency to the dielectric interface level, z, (i.e., fluid level when the upper dielectric is air)

$$\omega = \frac{1}{2\pi}\left[\frac{L\varepsilon_0 w l}{d}\left[\kappa_1 + (\kappa_2 - \kappa_1)\frac{z}{l}\right]\right]^{-1/2} \qquad (3)$$

Eq.(3) can be applied to a fluid-level measurement scenario where a fluid of interest having a dielectric constant $\kappa_2$ is stored in a tank and air having a dielectric constant $\kappa_1$ (i.e., a value of approximately 1.0) is above the fluid of interest. The variables L, $\varepsilon_0$, w, l and d are, respectively, the sensor inductance, emissivity of air, width of capacitor plates, length of capacitor plates, and the separation between plates. The variable z is the level of the fluid of interest between the capacitor's plates.

When the tank is empty, there is no fluid of interest between the capacitor's plates, so that z=0. Substituting these values into Eq. (3) results in $$\omega(0) = \frac{1}{2\pi}\left[\frac{L\varepsilon_0 w l}{d}\right]^{-1/2} = \omega_{empty} \qquad (3a)$$
$$\omega(z) = \omega_{empty}\left[1 + (\kappa_2 - 1)\frac{z}{l}\right]^{-1/2}.$$

When the tank is full, the fluid of interest completely fills the gap between the capacitor's plates so that z=l. In this case, Eq. (3a) becomes $$\omega(l) = \frac{\omega_{empty}}{\sqrt{\kappa_2}} = \omega_{full} \qquad (3b)$$

or $$\kappa_2 = \left(\frac{\omega_{empty}}{\omega_{full}}\right)^2$$

$$\omega(L) = \omega_{empty}\left[1 + \left[\left(\frac{\omega_{empty}}{\omega_{full}}\right)^2 - 1\right]L\right]^{-1/2}.$$

where L=z/l is the fractional level that the sensor's capacitor's plates are immersed with respect to being fully immersed in the fluid of interest. Therefore, a frequency response calibration algorithm of the present invention is defined as $$\omega(L) = \frac{\omega_{empty}}{\sqrt{1 + \left(\left(\frac{\omega_{empty}}{\omega_{full}}\right)^2 - 1\right)L}}. \qquad (4)$$

$\omega_{empty}$ is the sensor's response frequency when the sensor's capacitor plates are not in fluid or exposed to any dielectric, e.g., this would occur when the sensor's capacitor plates are in a completely empty container, $\omega_{full}$ is the sensor response frequency when the sensor's capacitor plates are completely immersed in a fluid of interest, e.g., this would occur when the sensor's capacitor plates are in a container that has been filled with a fluid of interest, and $\omega(L)$ is the sensor response frequency that is expected when sensor's capacitor plates are partially immersed in the fluid of interest to the fractional level, L.

Figure 2:
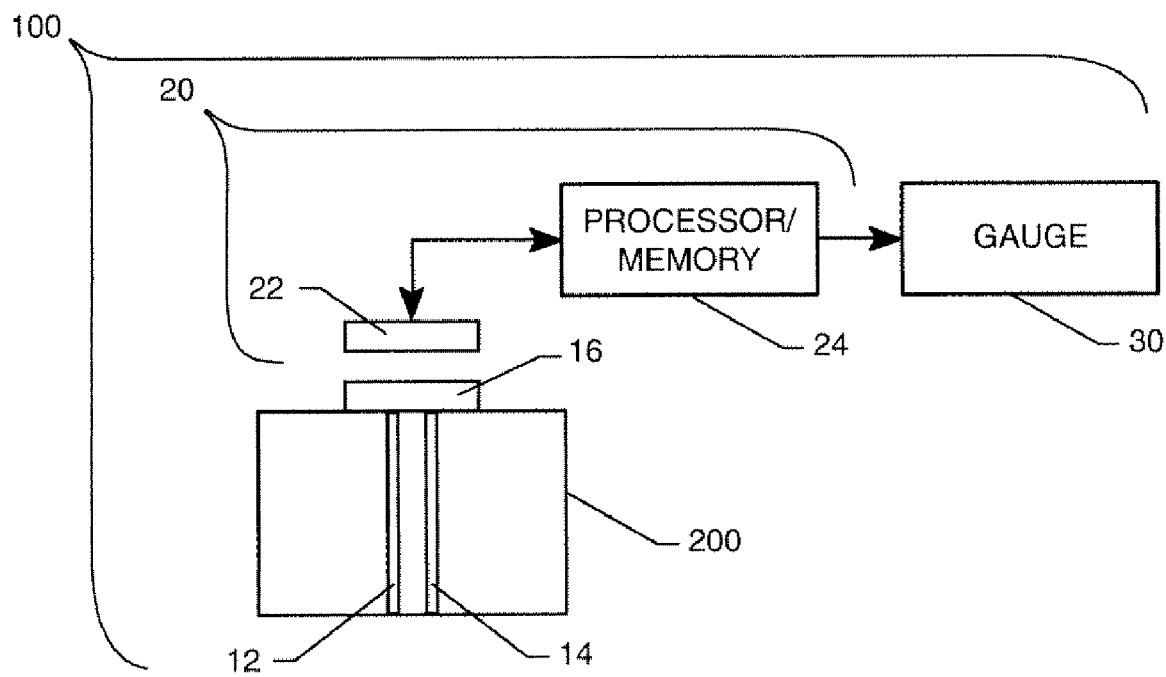
FIG. 2 is a schematic view of a wireless magnetic field response fluid-level measurement system that can be calibrated in accordance with the method of the present invention.

Referring now to FIG. 2, a wireless fluid-level measurement system 100 that can be calibrated in accordance with the present invention is shown. Similar to FIG. 1, only the essential functional elements of measurement system 100 are illustrated. The above-described sensor circuit has electroplates 12 and 14 (i.e., a capacitor) electrically coupled to inductor 16 with electroplates 12/14 positioned to span the height of a receptacle 200 that will be used to store a fluid of interest. This sensor circuit is powered/interrogated by a magnetic field response recorder 20 that is described in detail in each of the previously cited U.S. Pat. Nos. 7,086,593 and 7,159,774. Briefly, recorder 20 includes an antenna 22 and a processor/memory 24. Antenna 22 inductively couples signals (i) to inductor 16 to stimulate a magnetic field response, and (ii) from inductor 16 so that processor/memory 24 can record the frequency of the response. The frequency of the response is used to control the output of a fluid level gauge 30.

In accordance with the present invention, measurement system 100 is first operated to record a frequency response when receptacle 200 is empty. This baseline response or $\omega_{empty}$ is stored (e.g., onboard the recorder's processor/memory 24) for later use. When a new fluid of interest is to be stored in receptacle 200 such that measurement system 100 must be calibrated therefor, the calibration method of the present invention requires that receptacle 200 be filled with the fluid of interest so that electroplates 12 and 14 are completely immersed in the fluid. In the instance where measurement system 100 is being used to measure the entire capacity of receptacle 200 (e.g., as in the illustrated example where electroplates 12 and 14 span the full height of receptacle 200), the complete immersion of electroplates 12 and 14 is achieved by the complete filling of receptacle 200 with the fluid of interest.

With electroplates 12 and 14 immersed in the fluid of interest, recorder 20 is operated to record a frequency response that is designated $\omega_{full}$. Once the response values of $\omega_{empty}$ and $\omega_{full}$ are known, the above frequency response calibration algorithm (i.e., Eq. (3)) can be used to non-manually generate a table of expected frequency responses for a corresponding number of "fractional levels" of electroplate immersion in the fluid of interest. The generation of the expected frequency responses and the storage thereof could be carried out by processor/memory 24 onboard recorder 20.

When an actual (unknown) fluid level within receptacle 200 is to be determined, measurement system 100 is again operated to generate/record a frequency response of the sensor circuit defined by electroplates 12/14 and inductor 16. The recorded frequency response is compared to the generated set of expected frequency responses stored by processor/memory 24, with the closest match therebetween driving the operation of gauge 30 to provide an indication of the fractional level of the fluid of interest in receptacle 200. If the fluid level responses are used near the empty and full fractional level but not at the exact empty and full levels, respectively, the methods described herein are applicable but will result in a small error to the calibration algorithm.

In another embodiment, the measurement system undergoes a series of calibrations using different dielectric substances prior to in-field use. The values of the dielectric should have values that cover the anticipated values and, if possible, extend beyond them. This embodiment uses an interpolating polynomial. To demonstrate the method, a Lagrange interpolating polynomial will be used. Interpolating polynomials are used in numerical analysis to define a function whose output is equal to another function or to a set of data for a specified set of input data. An interpolating polynomial can also be created based upon known measurements that defines a calibration curve. Other similar polynomial techniques can also be used. An advantage gained from this method is that the first reference fluid level and second reference fluid level need not be at empty and full, respectively.

Use of the Lagrange method for creating an interpolating polynomial is as follows. For n measured sensor response frequencies taken at n fractional fluid-levels, $L_k$, a function $\omega(L)$ can be defined that interpolates a curve between all measured points.

The function $\omega(L)$ is defined as $$\omega(L)=f(L_0)w_0(L)+f(L_1)w_1(L)+\ldots+f(L_n)w_n(L) \quad (5)$$

where $$w_n(L) = \frac{(L-L_0)(L-L_1)\ldots(L-L_{k-1})(L-L_{k+1})\ldots(L-L_n)}{(L_k-L_0)(L_k-L_1)\ldots(L_k-L_{k-1})(L_k-L_{k+1})\ldots(L_k-L_n)} \quad (6)$$

for k=0, 1, 2, 3, ..., n. and $f(L_\kappa)=\omega_\kappa$ is the sensor response at fractional length $L_\kappa$. $L_0$ is the first reference fractional fluid level and $L_n$ is the second reference fractional fluid level. $L_0$ and $L_n$ do not need to be at the empty and full levels. $L_1$ through $L_{n-1}$ are intermediate fractional fluid levels.

For example, if fractional levels of L=0.0, 0.5 and 1.0 are used, corresponding to responses of $\omega_0$, $\omega_1$ and $\omega_2$, the calibrated response function is $$\omega(L)=2[\omega_0(L-0.5)(L-1)-2\omega_1 L(L-1)+2\omega_2 L(L-0.5)]. \quad (7)$$

The response function $\omega(L)$ uses the response of an empty, half empty and full container. The empty response $\omega_0$ can be measured at the factory, maintenance facility or in-field, and similarly for the full response, $\omega_2$. However, accurate measurement of the half-empty response $\omega_1$ can only be measured at the factory or maintenance facility. While in-field, the response of the half-full container can be estimated by interpolating Table 1. The values in the table are stored in the magnetic field response recorder 20.

TABLE 1

| | Measured sensor response at fractional levels for various dielectric levels. | | | |
|---|---|---|---|---|
| Sensor | Dielectric Value | | | |
| Response | $\kappa_0$ | $\kappa_1$ | $\kappa_2$ | $\kappa_3$ |
| $\omega_0(\kappa)$ at fractional level 0.0 | $\omega_0(\kappa_0)$ | $\omega_0(\kappa_1)$ | $\omega_0(\kappa_2)$ | $\omega_0(\kappa_3)$ |
| $\omega_1(\kappa)$ at fractional level 0.5 | $\omega_1(\kappa_0)$ | $\omega_1(\kappa_1)$ | $\omega_1(\kappa_2)$ | $\omega_1(\kappa_3)$ |
| $\omega_2(\kappa)$ at fractional level 1.0 | $\omega_2(\kappa_0)$ | $\omega_2(\kappa_1)$ | $\omega_2(\kappa_2)$ | $\omega_2(\kappa_3)$ |

For example, an in-field non-manual calibration with the sensor response $\omega_2$ for the full container is measured between $\omega_2(\kappa_2)$ and $\omega_2(\kappa_3)$, and the half-empty response $\omega_1$ is estimated by interpolating between $\omega_1(\kappa_2)$ and $\omega_1(\kappa_3)$.

$$\frac{(\omega_2 - \omega_2(\kappa_2))}{(\omega_2(\kappa_2) - \omega_2(\kappa_3))} = \frac{(\omega_1 - \omega_1(\kappa_2))}{(\omega_1(\kappa_2) - \omega_1(\kappa_3))} \quad (8)$$

$$\omega_1 = \frac{(\omega_2 - \omega_2(\kappa_2))}{(\omega_2(\kappa_2) - \omega_2(\kappa_3))}(\omega_1(\kappa_2) - \omega_1(\kappa_3)) + \omega_1(\kappa_2)$$

Therefore, using Eq. (7), the responses, $\omega_0$ and $\omega_2$, for the empty and full containers respectively, measured in-field and the estimated response for the half-full container, $\omega_1$, can be used to produce the calibration curve, $\omega(L)$ for fractional levels of L. Although shown for three fractional levels, the Lagrange interpolating polynomial method could be applied to any number of desired fractional levels. The method of using interpolating polynomials is applicable to developing calibration curves for frequency and capacitance responses variation with fractional fluid-level.

In a further embodiment, a method of in-field calibration could utilize calibration curves for different combinations of first and second response frequencies readings corresponding to first and second reference levels. The calibration curves correlate sensor frequency response with fluid fractional level. The first and second response pairs and their respective curves are stored in the memory of the magnetic field response recorder 20. Upon switching to a different fluid, a user could engage a new response calibration (e.g., press a calibrate button) in which the magnetic field response recorder would take the in-field measured pair of first and second response frequencies at the corresponding to first and second reference levels and find the pair whose values are closest to those stored in memory. The response recorder would then use the calibration curve stored in memory corresponding to the stored response frequency pair closest to the measured response pair.

The present invention is not limited to use with sensor circuits that generate a magnetic field response when interrogated. For example, if a pure capacitance sensor was to be used, the calibration algorithm of the present invention could be capacitance based and defined as $$C(L) = C_{empty}\left[1 + \left(\left(\frac{C_{empty}}{C_{full}}\right) - 1\right) * L\right] \quad (5)$$

where L is the fractional portion of the sensor's capacitor plates that are immersed in a fluid of interest, $C_{empty}$ is the sensor's capacitance when the sensor's capacitor plates are not in fluid or exposed to any dielectric, e.g., this would occur when the sensor's capacitor plates are in a completely empty container, $C_{full}$ is the sensor's capacitance when the sensor's capacitor plates are completely immersed in a fluid of interest, e.g., this would occur when the sensor's capacitor plates are in a container that has been filled with a fluid of interest, and $C(L)$ is the sensor's capacitance that is expected when sensor's capacitor plates are partially immersed in the fluid of interest to the fractional level.

The advantages of the present invention are numerous. Frequency-response and capacitance-response based fluid-level measurement systems can be non-manually calibrated in-situ. The method facilitates a calibration that correlates sensor response to a receptacle's fractional fluid level without knowledge of a fluid's dielectric constant, sensor geometry, the dielectric constant of any material that might be used to encase the sensor, or the fluid receptacle's geometry. The present invention is particularly well-suited to be paired with recently-developed wireless fluid-level measurement systems thereby making these measurement systems excellent candidates for use in vehicle engines designed to work with different types of fuels. Further discussion is provided in S. E. Woodard and B. D. Taylor, A Wireless Fluid-Level Measurement Technique, NASA Technical Memorandum 2006-214320, and S. E. Woodard and B. D. Taylor, A wireless fluid-level measurement technique, Sensors and Actuators A 137 (2007) 268-278, the contents of each being hereby incorporated by reference in their entirety.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed is:

1. A method of calibrating a fluid-level measurement system having fluid level sensing means that generates a response based on the portion of said fluid level sensing means that is immersed in a fluid, said method comprising the steps of:
   recording a first response of said fluid level sensing means when said fluid level sensing means is not in contact with said fluid of interest;
   recording a second response of said fluid level sensing means when said fluid level sensing means is fully immersed in said fluid of interest; and
   generating, using said first response and said second response, a plurality of expected responses of said fluid level sensing means for a corresponding plurality of fractional levels of immersion of said fluid level sensing means in said fluid of interest.

2. A method according to claim 1 wherein each of said first response, said second response, and said plurality of expected responses is frequency-based.

3. A method according to claim 1 wherein each of said first response, said second response, and said plurality of expected responses is capacitance-based.

4. A method according to claim 1 wherein each of said plurality of expected responses is determined in accordance with $$\omega_E(L) = \frac{\omega_1}{\sqrt{1 + \left(\left(\frac{\omega_1}{\omega_2}\right)^2 - 1\right) * L}}$$

where $\omega_E(L)$ is an expected frequency response comprising one of said plurality of expected responses associated with a corresponding one of said plurality of levels of immersion,
   L is a fractional value indicative of one of said plurality of levels of immersion as compared to said fluid level sensing means being fully immersed in said fluid of interest,
   $\omega_1$ is a frequency response comprising said first response, and
   $\omega_2$ is a frequency response comprising said second response.

5. A method according to claim 1 wherein each of said plurality of expected responses is determined in accordance with $$C_E(L) = \frac{C_1}{\sqrt{1 + \left(\left(\frac{C_1}{C_2}\right)^2 - 1\right) * L}}$$

where $C_E(L)$ is an expected capacitance response comprising one of said plurality of expected responses associated with a corresponding one of said plurality of levels of immersion, L is a fractional value indicative of one of said plurality of levels of immersion as compared to the fluid level sensing means being fully immersed in said fluid of interest, $C_1$ is a capacitance response comprising said first response, and $C_2$ is a capacitance response comprising said second response.

6. A method according to claim 1 wherein said steps of recording include the step of wirelessly interrogating said fluid level sensing means to record said first response and said second response.

7. A method of calibrating a fluid-level measurement system having fluid level sensing means that generates a response based on the portion of said fluid level sensing means that is immersed in a fluid, said method comprising the steps of:
   providing a receptacle with said fluid sensing means mounted therein for detecting a level of said fluid of interest in the receptacle;
   recording a first response of said fluid level sensing means when said receptacle is empty;
   recording a second response of said fluid level sensing means when said receptacle is filled with said fluid of interest; and
   generating, using said first response and said second response, a plurality of expected responses of said fluid level sensing means for a corresponding plurality of levels of said fluid of interest in said receptacle.

8. A method according to claim 7 wherein each of said first response, said second response, and said plurality of expected responses is frequency-based.

9. A method according to claim 7 wherein each of said first response, said second response, and said plurality of expected responses is capacitance-based.

10. A method according to claim 7 wherein each of said plurality of expected responses is determined in accordance with $$\omega_E(L) = \frac{\omega_1}{\sqrt{1 + \left(\left(\frac{\omega_1}{\omega_2}\right)^2 - 1\right) * L}}$$

where $\omega_E(L)$ is an expected frequency response comprising one of said plurality of expected responses associated with a corresponding one of said plurality of levels, L is a fractional value indicative of one of said plurality of levels as compared to the receptacle being filled with said fluid of interest, $\omega_1$ is a frequency response comprising said first response, and $\omega_2$ is a frequency response comprising said second response.

11. A method according to claim 7 wherein each of said plurality of expected responses is determined in accordance with $$C_E(L) = C_1 \left[1 + \left(\left(\frac{C_1}{C_2}\right) - 1\right) * L\right]$$

where $C_E(L)$ is an expected capacitance response comprising one of said plurality of expected responses associated with a corresponding one of said plurality of levels, L is a fractional value indicative of one of said plurality of levels as compared to the receptacle being filled with said fluid of interest, $C_1$ is a capacitance response comprising said first response, and $C_2$ is a capacitance response comprising said second response.

12. A method according to claim 7 wherein said steps of recording include the step of wirelessly interrogating said fluid level sensing means to record said first response and said second response.

13. A method of calibrating a fluid-level measurement system having wireless fluid level sensing means that generates a response based on the portion of said wireless fluid level sensing means that is immersed in a fluid wherein said response so-generated is one of a frequency response and a capacitance response, said method comprising the steps of:
   providing a receptacle with said wireless fluid sensing means mounted therein for detecting a level of a fluid of interest in said receptacle;
   recording a first response of said wireless fluid level sensing means when said receptacle is empty;
   recording a second response of said wireless fluid level sensing means when said receptacle is filled with said fluid of interest; and
   generating, using said first response and said second response, a plurality of expected responses of said wireless fluid level sensing means for a corresponding plurality of levels of said fluid of interest in said receptacle.

14. A method according to claim 13 wherein said response so-generated by said wireless fluid level sensing means is a frequency response, and wherein each of said plurality of expected responses is determined in accordance with $$\omega_E(L) = \frac{\omega_1}{\sqrt{1 + \left(\left(\frac{\omega_1}{\omega_2}\right)^2 - 1\right) * L}}$$

where $\omega_E(L)$ is an expected frequency response comprising one of said plurality of expected responses associated with a corresponding one of said plurality of levels, L is a fractional value indicative of one of said plurality of levels as compared to said receptacle being filled with said fluid of interest, $\omega_1$ is a frequency response comprising said first response, and $\omega_2$ is a frequency response comprising said second response.

15. A method according to claim 13 wherein said response so-generated by said wireless fluid level sensing means is a capacitance response, and wherein each of said plurality of expected responses is determined in accordance with $$C_E(L) = C_1\left[1 + \left(\left(\frac{C_1}{C_2}\right) - 1\right) * L\right]$$

where $C_E(L)$ is an expected capacitance response comprising one of said plurality of expected responses associated with a corresponding one of said plurality of levels, L is a fractional value indicative of one of said plurality of levels as compared to said receptacle being filled with said fluid of interest, $C_1$ is a capacitance response comprising said first response, and $C_2$ is a capacitance response comprising said second response.

16. A method of calibrating a fluid-level measurement system having fluid level sensing means that generates a response based on the portion of said fluid level sensing means that is immersed in a fluid, said method comprising the steps of:

(i) recording and storing a first response of said fluid level sensing means when said fluid level sensing means is not in contact with said fluid of interest;

(ii) recording and storing a second response of said fluid level sensing means when said fluid level sensing means is fully immersed in said fluid of interest;

(iii) recording and storing one or more additional intermediate responses of said fluid level sensing means wherein each said intermediate response corresponds to a particular additional level of immersion of said fluid level sensing means in said fluid of interest;

(iv) repeating the above steps (i), (ii) and (ii) for a range of fluid dielectric values of interest;

(v) measuring and recording an in-field first response and an in-field second response;

(vi) retrieving from said plurality of stored first and second responses and their respective fractional levels, the pair (or pairs) of said stored first and second responses that is nearest in value to said in-field first and second responses;

(vii) retrieving said stored intermediate responses and their respective fractional levels that correspond to said retrieved first and second responses;

(viii) using an interpolation means to generate in-field intermediate responses from said first retrieved response, said second retrieved response and all said intermediate retrieved responses and their corresponding fractional levels; and (ix) generating, using said in-field first response, said second in-field second response, and said interpolated intermediate responses, a plurality of expected responses of said fluid level sensing means for a corresponding plurality of fractional levels of immersion of said fluid level sensing means in said fluid of interest.

17. A method according to claim 16 wherein each of said first response, said second response, said one or more intermediate responses, and said plurality of expected responses is frequency-based.

18. A method according to claim 16 wherein each of said first response, said second response, said one or more intermediate responses, and said plurality of expected responses is capacitance-based.

19. A method according to claim 16 wherein each of said plurality of expected responses is determined in accordance with an interpolating polynomial.

20. A method according to claim 16 wherein said steps of recording include the step of wirelessly interrogating said fluid level sensing means to record said first response, said second response, and said intermediate responses.

21. A method of calibration of a fluid-level measurement system having fluid level sensing means that generates a response based on the portion of said fluid level sensing means that is immersed in a fluid, said method comprising the steps of:

(i) recording and storing a first response of said fluid level sensing means when said fluid level sensing means is immersed in said fluid of interest at a first reference level;

(ii) recording and storing a second response of said fluid level sensing means when said fluid level sensing means is immersed in said fluid of interest at a second reference level;

(iii) recording and storing one or more additional intermediate responses of said fluid level sensing means wherein each said intermediate response corresponds to a particular level of immersion of said fluid level sensing means in said fluid of interest;

(iv) repeating the above steps (i), (ii) and (ii) for a range of fluid dielectric values of interest;

(v) generating, using said first stored response, said second stored response, and said one or more intermediate stored responses, a plurality of expected responses of said fluid level sensing means for a corresponding plurality of fractional levels of immersion of said fluid level sensing means in said fluid of interest;

(vi) generating and storing a separate calibration curve for each fluid dielectric using said first stored response, said second stored response, said one or more intermediate stored responses, and said plurality of expected responses;

(vii) measuring a first in-field response and a second in-field response; and (viii) utilizing the stored calibration curve having a first response and a second response closest to said in-field measured first and second responses.

22. A method according to claim 21 wherein each of said first response, said second response, said one or more intermediate responses, and said plurality of expected responses is frequency-based.

23. A method according to claim 21 wherein each of said first response, said second response, said one or more intermediate responses, and said plurality of expected responses is capacitance-based.

* * * * *